(12) United States Patent
Adachi (10) Patent No.: US 10,155,433 B2
(45) Date of Patent: Dec. 18, 2018

(54) VEHICLE DOOR

(71) Applicant: TOYOTA JIDOSHA KABUSHIKI KAISHA, Toyota-shi, Aichi-ken (JP)

(72) Inventor: Yoshiyuki Adachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/640,990

(22) Filed: Jul. 3, 2017

(65) Prior Publication Data

US 2018/0056762 A1 Mar. 1, 2018

(30) Foreign Application Priority Data

Aug. 30, 2016 (JP) .................................. 2016-168336

(51) Int. Cl.
| | |
|---|---|
| *B60J 5/10* | (2006.01) |
| *B60Q 1/26* | (2006.01) |
| *B60Q 1/30* | (2006.01) |
| *F21V 3/00* | (2015.01) |

(52) U.S. Cl.
CPC ............ *B60J 5/107* (2013.01); *B60Q 1/2661* (2013.01); *B60Q 1/30* (2013.01); *F21V 3/00* (2013.01)

(58) Field of Classification Search
CPC ............ B60Q 1/2661; B60Q 1/30; F21V 3/00
See application file for complete search history.

(56) References Cited

U.S. PATENT DOCUMENTS

| 2008/0093880 A1* | 4/2008 | Westermann .......... B60J 7/0076 296/107.17 |
| 2008/0157558 A1* | 7/2008 | Bensmann ............. B60J 1/1823 296/107.07 |
| 2016/0101671 A1* | 4/2016 | Michalopoulos ....... B60R 13/07 296/193.12 |

FOREIGN PATENT DOCUMENTS

| JP | 2010-030465 A | | 2/2010 |
| JP | 2010030465 A | * | 2/2010 |
| JP | 2011-031686 A | | 2/2011 |

* cited by examiner

*Primary Examiner* — Kevin Quarterman
(74) *Attorney, Agent, or Firm* — Oliff PLC (57) ABSTRACT

The present disclosure provides a backlift type vehicle door provided at a vehicle body rear portion including: an outer panel that is curved such that a vehicle width direction middle portion is disposed further toward a vehicle outer side than two vehicle width direction end portions; a lamp fitting recess portion, formed by the outer panel being recessed, into which a rear lamp is to be fitted, and in which plural connection portions at which the rear lamp is to be connected are formed in a floor wall of the lamp fitting recess portion; and a water-retaining recess portion, formed in the floor wall at a vehicle width direction outer side relative to a connection portion that is disposed furthest to the vehicle width direction outer side, and is recessed further toward the vehicle inner side than the connection portion.

4 Claims, 11 Drawing Sheets

VEHICLE DOOR

CROSS-REFERENCE TO RELATED APPLICATION

This application claims priority under 35 USC 119 from Japanese Patent Application No. 2016-168336, filed on Aug. 30, 2016 the disclosure of which is incorporated by reference herein.

BACKGROUND

Technical Field

The present disclosure relates to a door for a vehicle.

Related Art

Japanese Patent Application Laid-Open (JP-A) No. 2010-030465 discloses a backlift-type back door that opens and closes a door opening formed in a rear portion of a vehicle body. An outer panel of the back door is curved such that a vehicle width direction middle portion is disposed further to a vehicle outer side than both of vehicle width direction end portions thereof. Rear lamps are mounted at the two vehicle width direction ends of the outer panel.

In a structure in which rear lamps are mounted at two vehicle width direction ends of an outer panel as in the back door with the structure described above, rainwater may ingress into gaps between the rear lamps and the outer panel, and may be retained in these gaps. Further, this water may flow towards the vehicle width direction outer sides when the door is opened. If the flows of water are large, the water may drip into the vehicle cabin from the vehicle width direction end portions of the outer panel, or splash may occur. In particular, in a vehicle in which the back door is retained directly above the door opening when the door is open, as in a liftback-type vehicle, water dripping from the vehicle width direction end portions of the outer panel may drip into a luggage compartment.

SUMMARY

The present disclosure provides a vehicle door that may prevent or inhibit water, that has ingressed between an outer panel and a rear lamp, from dripping down from a vehicle width direction end portion of the outer panel when the door is opened.

A first aspect of the present disclosure is a vehicle door of a backlift type that opens and closes an opening formed in a vehicle body rear portion, the vehicle door including: an outer panel that is curved such that a vehicle width direction middle portion of the outer panel is disposed further toward a vehicle outer side than two vehicle width direction end portions of the outer panel; a lamp fitting recess portion, formed by the outer panel being recessed to a vehicle inner side at each of the two vehicle width direction ends of the outer panel, into which a rear lamp is to be fitted, and in which a plurality of connection portions at which the rear lamp is to be connected are formed in a floor wall of the lamp fitting recess portion; and a water-retaining recess portion formed in the floor wall at a vehicle width direction outer side relative to a connection portion, of the plurality of connection portions, that is disposed furthest to the vehicle width direction outer side, the water-retaining recess portion being recessed further toward the vehicle inner side than the connection portion that is disposed furthest toward the vehicle width direction outer side.

According to the vehicle door of the first aspect of the present disclosure, the outer panel is curved such that the vehicle width direction middle portion is disposed at the vehicle outer side relative to the two vehicle width direction end portions. The lamp fitting recess portions, into which the rear lamps are fitted, are formed by recessing the two vehicle width direction ends of the outer panel towards the vehicle inner side. At the floor portion of each lamp fitting recess portion, the plural connecting portions, to which the rear lamp is connected, are formed. In addition, the water-retaining recess portion is formed at the vehicle width direction outer side relative to the connecting portion, among the plural connecting portions, that is disposed furthest to the vehicle width direction outer side. The water-retaining recess portion is recessed to the vehicle inner side relative to the connecting portion that is disposed furthest to the vehicle width direction outer side. Therefore, when the door is opened, water, that has ingressed between the lamp fitting recess portion and the rear lamp at the vehicle width direction middle side relative to the water-retaining recess portion, flows toward the vehicle width direction outer side, enters the water-retaining recess portion, and is pooled in the water-retaining recess portion. Thus, water that has ingressed between the lamp fitting recess portions of the outer panel and the rear lamps is prevented or inhibited from dripping down from the vehicle width direction end portions of the outer panel.

In a second aspect of the present disclosure, in the vehicle door of the first aspect, the rear lamp may be disposed further toward the vehicle outer side than an opening portion of the water-retaining recess portion.

According to the second aspect of the present disclosure, each rear lamp is disposed at the vehicle outer side relative to the opening portion of the water-retaining recess portion. Thus, the rear lamp is structured such that no portion of the rear lamp enters the water-retaining recess portion. Therefore, a maximum water retention amount of the water-retaining recess portion may be increased compared to a structure in which a portion of a rear lamp enters a water-retaining recess portion.

In a third aspect of the present disclosure, in the vehicle door of the first aspect or the second aspect, the lamp fitting recess portion may include upper and lower inner wall faces that oppose one another in an up-and-down direction of the outer panel; and at opening edge portions of the lamp fitting recess portion, the upper and lower inner wall faces may continue into respective faces at the vehicle outer side of the outer panel, via single curved surfaces that are curved in a vehicle width direction view.

Since the third aspect of the present disclosure is structured as described above, when the door is opened, rainwater or the like, that has adhered to an opening edge portion of the lamp fitting recess portion or a vicinity thereof, is unlikely to flow toward the vehicle width direction outer side over the opening edge portion of the lamp fitting recess portion. Namely, in a structure of opening edge portions of a lamp fitting recess portion in which, for example, upper and lower inner wall faces of the lamp fitting recess portion continue into respective faces at the vehicle outer side of an outer panel via step-shaped faces formed of curved surfaces that are curved in a vehicle width direction view, when the door is opened, it would be easy for rainwater or the like that had adhered to an opening edge portion or a vicinity thereof to pass over the step-shaped surface and flow toward the vehicle width direction outer side. This water flowing to the vehicle width direction outer side might drip down from a vehicle width direction end portion of the outer panel. In contrast, this may be prevented or inhibited in the present disclosure.

In a fourth aspect of the present disclosure, in the vehicle door of any one of the first to third aspects, the lamp fitting recess portion may include upper and lower inner wall faces that oppose one another in an up-and-down direction of the outer panel; the water-retaining recess portion may include upper and lower inner wall faces that oppose one another in the up-and-down direction of the outer panel; and the upper and lower inner wall faces of the lamp fitting recess portion and the upper and lower inner wall faces of the water-retaining recess portion may continue without steps, respectively.

Since the fourth aspect of the present disclosure is structured as described above, water, that ingresses between the rear lamp and the lamp fitting recess portion at the vehicle width direction middle side relative to the water-retaining recess portion and flows over the upper and lower inner wall faces of the lamp fitting recess portion toward the vehicle width direction outer side, may smoothly flow into the water-retaining recess portion over the upper and lower inner wall faces of the water-retaining recess portion.

As described above, a vehicle door according to an above-described aspect of the present disclosure may prevent or inhibit water, that has ingressed between the outer panels and the rear lamps, from dripping down from the vehicle width direction end portions of the outer panel when the door is opened.

BRIEF DESCRIPTION OF THE DRAWINGS

Exemplary embodiments will be described in detail based on the following figures, wherein.

DETAILED DESCRIPTION

Below, a vehicle back door 10 (below referred to as "the back door 10"), which serves as a vehicle door relating to an exemplary embodiment of the present disclosure, is described using FIG. 1 to FIG. 6. Note that, an arrow FR, an arrow UP and an arrow OUT illustrated in the drawings indicate a forward direction (a progress direction) of the vehicle, an upward direction and outward in a width direction, respectively. Further, hereinbelow, descriptions are given using the directions, such as, front, rear, upper and lower, in relation to the back door 10. Note that these terms refer to directions relative to a vehicle 12 in a state in which the back door 10 is closed (the state illustrated in FIG. 1).

Figure 1:
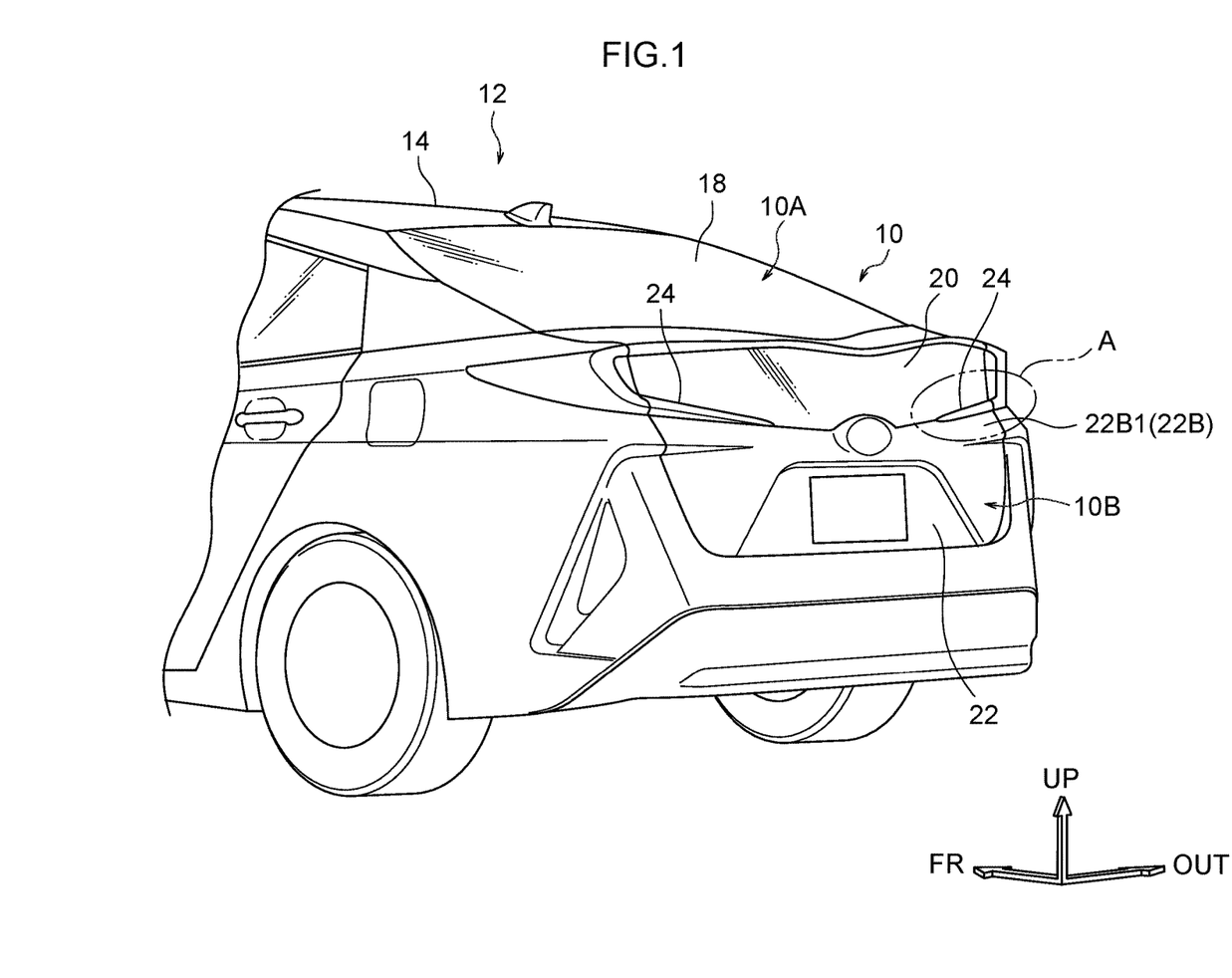
FIG. 1 is a perspective view in which a rear portion of a vehicle, at which a vehicle back door that serves as a vehicle door according to an exemplary embodiment is employed, is seen diagonally from the vehicle rear-left side in a state in which the vehicle back door is closed.
Figure 2:
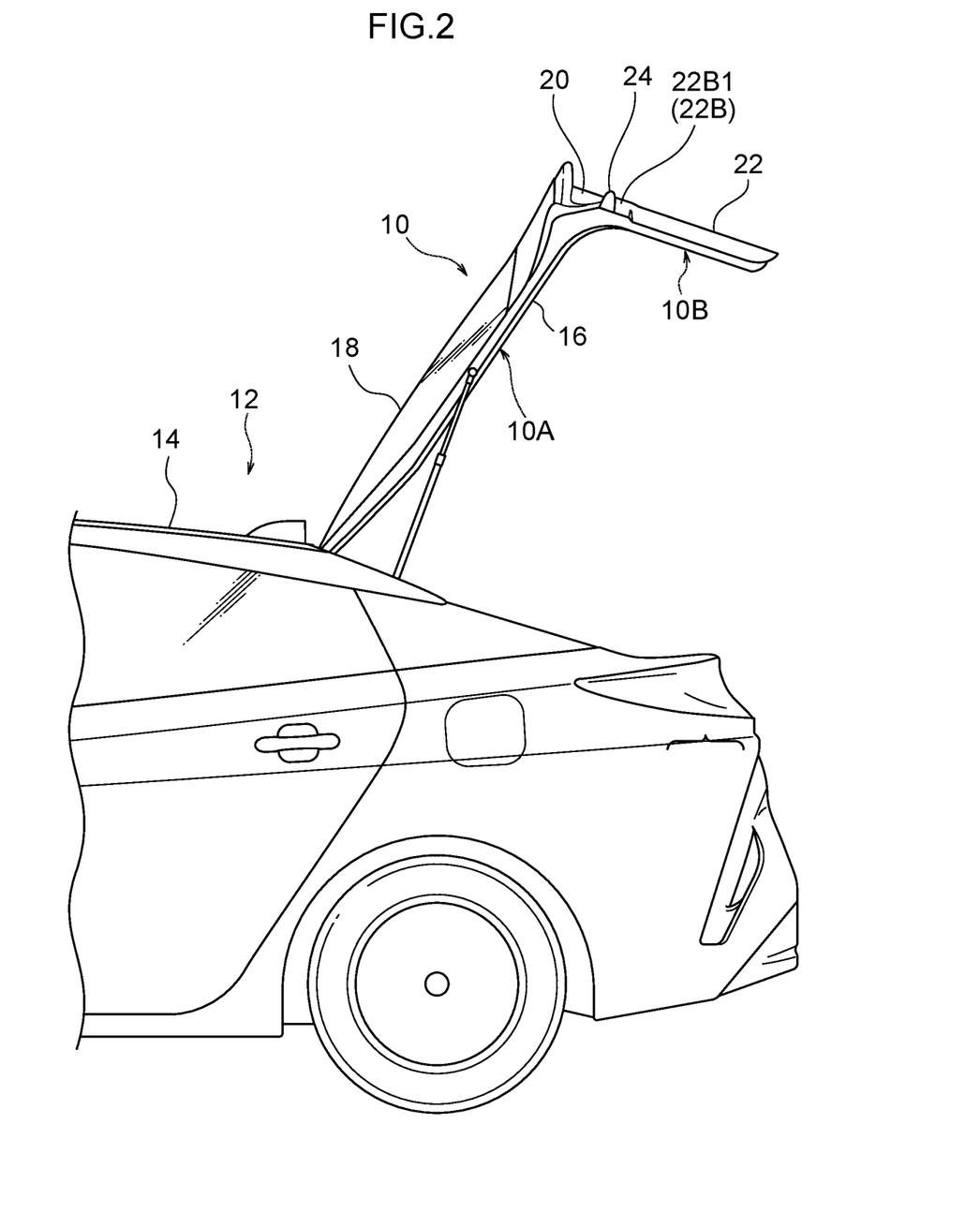
FIG. 2 is a side view of the rear portion of the vehicle seen from the vehicle left side in a state in which the vehicle back door is opened.
Figure 3:
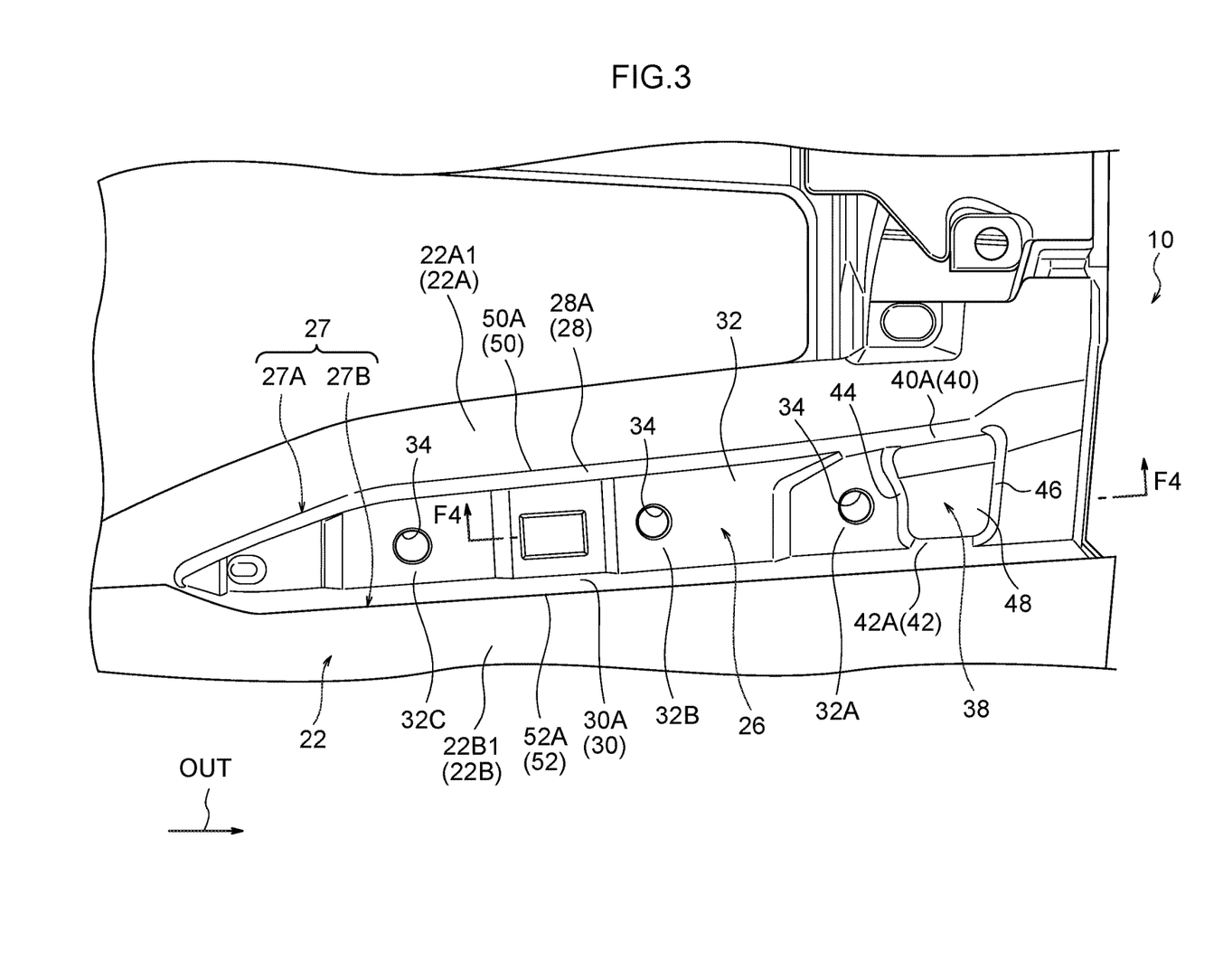
FIG. 3 is a rear view in which region A indicated in FIG. 1 is magnified and seen from the vehicle rear side, in a state in which a lower glass and rear lamp have been removed from the vehicle back door.

As illustrated in FIG. 1 and FIG. 2, the back door 10 according to the present exemplary embodiment is equipped to the vehicle 12, which is a liftback-type vehicle. The back door 10 is a back door of a backlift type that opens and closes an opening (a door opening), which is not illustrated in the drawings, formed in a rear portion of a vehicle body 14. An upper end portion of the back door 10 is coupled by hinges to the vehicle body 14 with an axial direction thereof along the vehicle width direction. Thus, the back door 10 is supported at the vehicle body 14 to be capable of opening and closing. The back door 10 is inflected in a substantial "L" shape in a vehicle side view, being structured by a door upper portion 10A and a door lower portion 10B. The door upper portion 10A extends diagonally in a gentle slope toward the vehicle lower-rear side from the upper end portion of the back door 10. The door lower portion 10B hangs toward the vehicle lower side from a rear end portion of the door upper portion 10A.

The back door 10 is provided with a door main body 16 (see FIG. 2), a back door glass 18, a back door lower glass 20, and a door outer panel 22. The door main body 16 includes a door inner panel (not illustrated in the drawings) formed of carbon fiber-reinforced plastic. The back door glass 18 is mounted at the door upper portion 10A, at a vehicle outer side of the door main body 16. The back door lower glass 20 is mounted at an upper portion of the door lower portion 10B, at the vehicle outer side of the door main body 16. The door outer panel 22 is mounted at the vehicle outer side of the door main body 16 below the back door lower glass 20. Note that the door outer panel 22 corresponds to the "outer panel" of the present disclosure.

Figure 4:
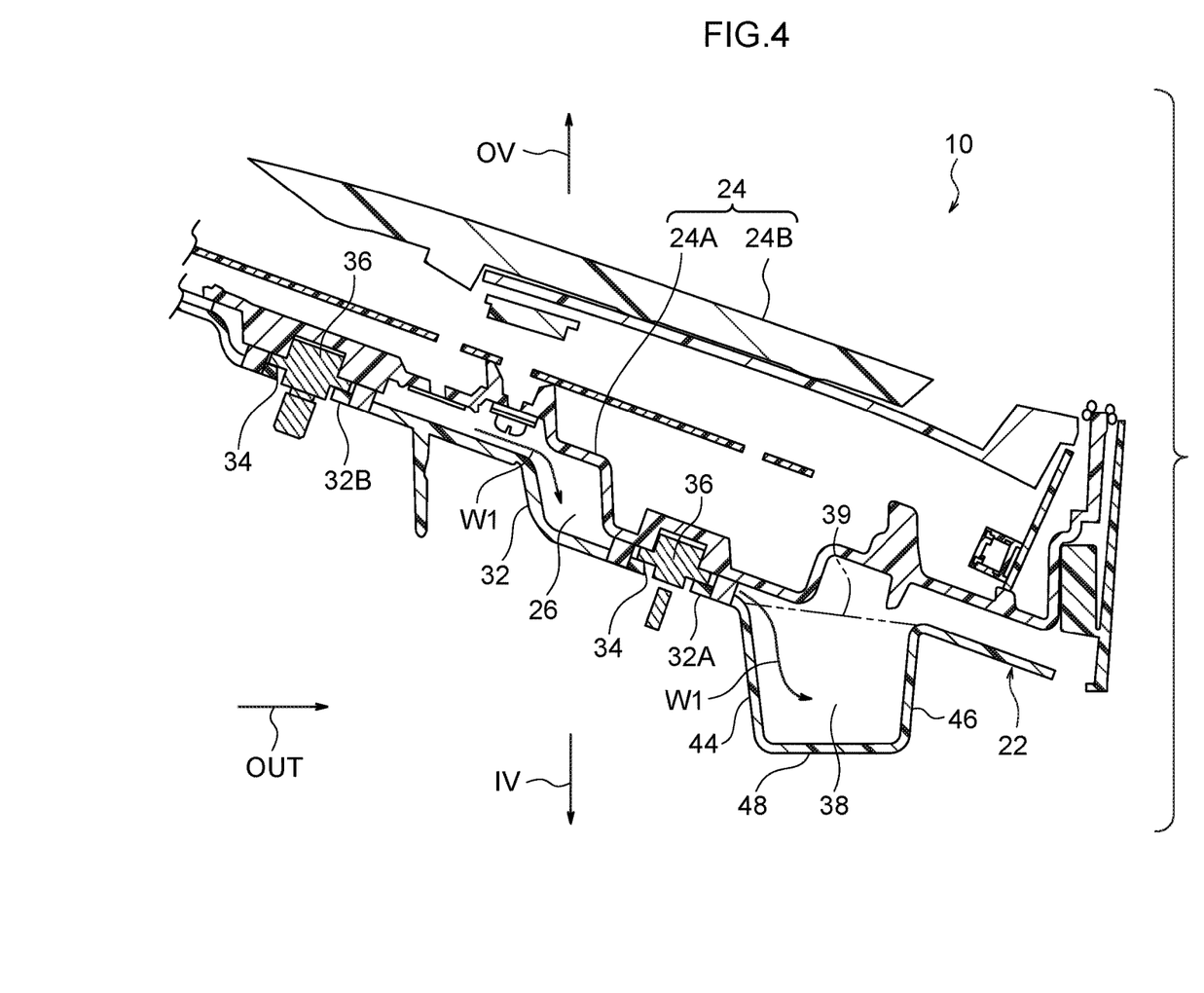
FIG. 4 is a sectional diagram illustrating a sectional view cut along line F4-F4 in FIG. 3, in a state in which the rear lamp has been mounted to an outer panel of the vehicle back door.
Figure 6:
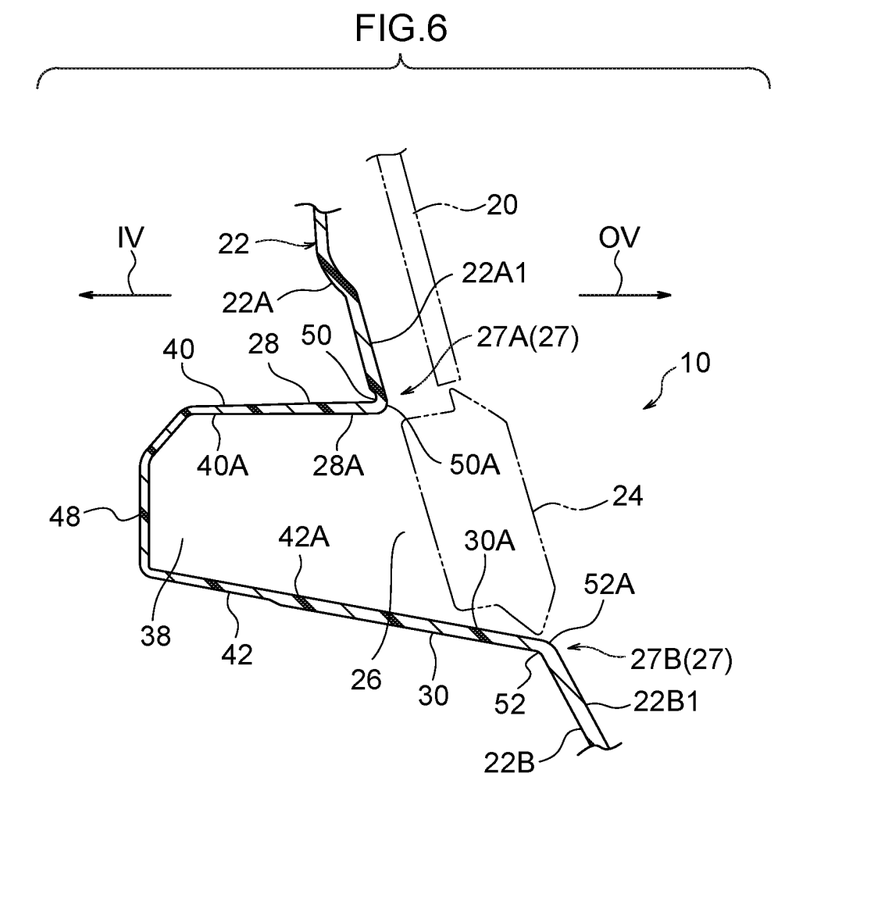
FIG. 6 is a sectional diagram illustrating a sectional view cut along line F6-F6 in FIG. 5.

The door outer panel 22 is formed of, for example, a polypropylene-based resin and constitutes a design surface of the back door 10. The door outer panel 22 is gently bowed such that a vehicle width direction middle portion thereof is disposed further to the vehicle outer side than two vehicle width direction end portions thereof. A left-and-right direction of the door outer panel 22 coincides with the left-and-right direction of the vehicle 12 (the vehicle width direction). An up-and-down direction of the door outer panel 22 substantially coincides with the up-and-down direction of the vehicle 12 in the closed state of the back door 10 (the state illustrated in FIG. 1) and substantially coincides with the front-and-rear direction of the vehicle 12 in the open state of the back door 10 (the state illustrated in FIG. 2). The vehicle rear side of the door outer panel 22 in the closed state of the back door 10 (see FIG. 1) is the vehicle outer side and the vehicle front side of the door outer panel 22 is the vehicle inner side. In FIG. 4 and FIG. 6, the side indicated by arrow OV is the vehicle outer side and the side indicated by arrow IV is the vehicle inner side.

As illustrated in FIG. 1, rear lamps 24 are mounted at the two vehicle width direction ends of the door outer panel 22. The rear lamps 24 are formed in long, narrow shapes that are longest in the vehicle width direction. Dimensions of the rear lamps 24 in the up-and-down direction of the door outer panel 22 decrease towards the vehicle width direction middle. The rear lamps 24 are fitted into lamp fitting recess portions 26 (see FIG. 3 and FIG. 4) that serve as first recess portions, which are formed at the two vehicle width direction ends of the door outer panel 22. In the open state of the door illustrated in FIG. 2, the lamp fitting recess portions 26 and the rear lamps 24 are disposed directly above a luggage compartment, which is not illustrated in the drawings, provided in the rear portion of the vehicle body 14.

Each lamp fitting recess portion 26 is recessed to the vehicle inner side, and is formed in a long, narrow shape that is longest in the vehicle width direction. The lamp fitting recess portion 26 includes an upper wall 28, a lower wall 30 and a floor wall 32, and is open to the vehicle outer side and the vehicle width direction outer side. The upper wall 28 and lower wall 30 oppose one another in the up-and-down direction of the door outer panel 22. The floor wall 32 connects vehicle inner side end portions of the upper wall 28 and lower wall 30. A lower face 28A of the upper wall 28 and an upper face 30A of the lower wall 30 correspond to "upper and lower inner wall faces of the lamp fitting recess portion" of the present disclosure, opposing one another in the up-and-down direction of the door outer panel 22.

The upper wall 28 and lower wall 30 are inclined so as to approach one another toward the vehicle width direction middle, and end portions thereof at the vehicle width direction middle side connect with one another. A plural number (three in this exemplary embodiment) of connecting portions 32A, 32B and 32C are formed in the floor wall 32 in a row in the vehicle width direction. The rear lamp 24 is connected up at the connecting portions 32A, 32B and 32C. Respective circular bolt holes 34 are formed in the connecting portions 32A, 32B and 32C. As illustrated in FIG. 4, each rear lamp 24 is provided with a housing 24A and a lens 24B. The housing 24A is open to the vehicle outer side and the lens 24B is mounted to the opening side of the housing 24A. The housing 24A is connected (fixed) to the plural connecting portions 32A, 32B and 32C described above by plural bolts 36 (see FIG. 4) that penetrate through the bolt holes 34 and plural nuts (not illustrated in the drawings).

A water-retaining recess portion 38 that serves as a second recess portion is formed at a vehicle width direction outer side end portion of the floor wall 32 of the lamp fitting recess portion 26. The water-retaining recess portion 38 is formed at the vehicle width direction outer side relative to the connecting portion 32A that, of the plural connecting portions 32A, 32B and 32C, is disposed furthest to the vehicle width direction outer side. The water-retaining recess portion 38 is recessed further to the vehicle inner side than the connecting portion 32A. The water-retaining recess portion 38 is open to the vehicle outer side. An opening portion 39 of the water-retaining recess portion 38 (see the two-dot chain line in FIG. 4) is disposed at the vehicle inner side relative to the housing 24A of the rear lamp 24. Namely, the present exemplary embodiment has a structure in which no portion of the rear lamp 24 enters into the water-retaining recess portion 38.

The water-retaining recess portion 38 includes an upper wall 40, a lower wall 42, a left wall 44, a right wall 46 and a floor wall 48, and is formed in a substantially rectangular shape viewed from the vehicle outer side. The upper wall 40 and lower wall 42 oppose one another in the up-and-down direction of the door outer panel 22, and the left wall 44 and right wall 46 oppose one another in the vehicle width direction. The floor wall 48 connects between vehicle inner side end portions of the upper wall 40, lower wall 42, left wall 44 and right wall 46. A lower face 40A of the upper wall 40 and an upper face 42A of the lower wall 42 correspond to "upper and lower inner wall faces of the water-retaining recess portion" of the present disclosure and oppose one another in the up-and-down direction of the door outer panel 22. The water-retaining recess portion 38 is formed so as to be open to the vehicle rear side in the closed state of the door and to be open to the vehicle upper side in the open state of the door. The water-retaining recess portion 38 has an internal capacity in which, for example, 22 ml of water may be pooled in the open state of the door.

Figure 5:
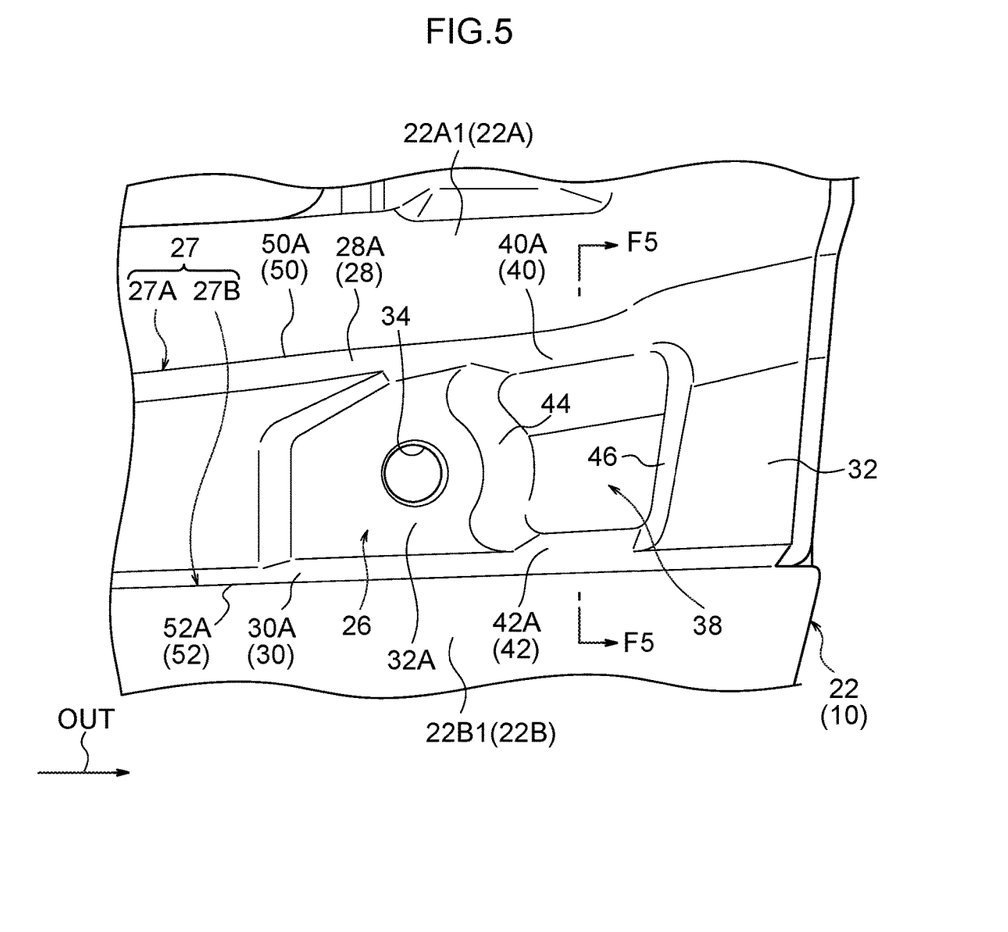
FIG. 5 is a magnified view in which a portion of FIG. 3 is magnified.

As illustrated in FIG. 5 and FIG. 6, the upper wall 40 of the water-retaining recess portion 38 is connected with the upper wall 28 of the lamp fitting recess portion 26 without a step. Thus, the lower face 40A of the upper wall 40 and the lower face 28A of the upper wall 28 continues with no step. Namely, the lower face 40A of the upper wall 40 and the lower face 28A of the upper wall 28 form a continuous surface with no step. Similarly, the lower wall 42 of the water-retaining recess portion 38 is connected with the lower wall 30 of the lamp fitting recess portion 26 without a step. Thus, the upper face 42A of the lower wall 42 and the upper face 30A of the lower wall 30 continues with no step. Namely, the upper face 42A of the lower wall 42 and the upper face 30A of the lower wall 30 form a continuous surface with no step.

The door outer panel 22 includes an upper extension portion 22A that extends above the lamp fitting recess portion 26 and a lower extension portion 22B that extends below the lamp fitting recess portion 26. A lower end portion of the upper extension portion 22A and a vehicle outer side end portion of the upper wall 28 are connected via a single inflection portion (curved portion) 50 that is inflected in a vehicle width direction view. The inflection portion 50 constitutes an upper edge portion 27A of an opening edge portion 27 of the lamp fitting recess portion 26, extending in the vehicle width direction. The inflection portion 50 forms a single inflected surface (curved surface or bowed surface) 50A that is inflected (curved or bowed) to form a protrusion to the vehicle outer side in the vehicle width direction view. The inflected surface 50A is formed along the whole of the upper edge portion 27A and forms a single ridge extending in the vehicle width direction at the vehicle outer side of the upper edge portion 27A. A face 22A1 at the vehicle outer side of the upper extension portion 22A and the lower face 28A of the upper wall 28 continues via the single inflected surface 50A. Namely, the present exemplary embodiment has a structure in which no step-shaped surface formed of plural curved surfaces that are curved in the vehicle width direction view is formed between the face 22A1 at the vehicle outer side of the upper extension portion 22A and the lower face 28A of the upper wall 28.

Similarly, an upper end portion of the lower extension portion 22B and a vehicle outer side end portion of the lower wall 30 are connected via a single inflection portion 52 that is inflected in the vehicle width direction view. The inflection portion 52 constitutes a lower edge portion 27B of the opening edge portion 27 of the lamp fitting recess portion 26, extending in the vehicle width direction. The inflection portion 52 forms a single inflected surface (curved surface or bowed surface) 52A that is inflected (curved or bowed) to form a protrusion to the vehicle outer side in the vehicle width direction view. The inflected surface 52A is formed along the whole of the lower edge portion 27B and forms a single ridge extending in the vehicle width direction at the lower edge portion 27B. The upper face 30A of the lower wall 30 and a face 22B1 at the vehicle outer side of the lower extension portion 22B continues via the single inflected surface 52A. Namely, the present exemplary embodiment has a structure in which no step-shaped surface formed of plural curved surfaces that are curved in the vehicle width direction view is formed between the face 22B1 at the vehicle outer side of the upper extension portion 22A and the upper face 30A of the lower wall 30. The face 22A1 at the vehicle outer side of the upper extension portion 22A and the face 22B1 at the vehicle outer side of the lower extension portion 22B correspond to the "faces at the vehicle outer side of the outer panel" of the present disclosure.

Now, operation and effects of the present exemplary embodiment are described.

In the back door 10 with the structure described above, the door outer panel 22 is bowed such that the vehicle width direction middle portion is disposed further to the vehicle outer side than the two vehicle width direction end portions. The lamp fitting recess portions 26, into which the rear lamps 24 are fitted, are formed to be recessed to the vehicle inner side, at the two vehicle width direction end portions of the door outer panel 22. In the floor wall 32 of each lamp fitting recess portion 26, the plural connecting portions 32A, 32B and 32C at which the rear lamp 24 is connected, are formed in a row in the vehicle width direction. Further, in the floor wall 32 of each lamp fitting recess portion 26, the water-retaining recess portion 38 is formed at the vehicle width direction outer side relative to the connecting portion 32A that is disposed furthest to the vehicle width direction outer side.

The above described water-retaining recess portion 38 is recessed to the vehicle inner side relative to the connecting portion 32A that is disposed furthest to the vehicle width direction outer side. Therefore, when the door is opened, water, that has ingressed between the lamp fitting recess portion 26 and the rear lamp 24 at the vehicle width direction middle side relative to the water-retaining recess portion 38, flows toward the vehicle width direction outer side, enters into the water-retaining recess portion 38, and is pooled in the water-retaining recess portion 38 (see the arrows W1 in FIG. 4). Thus, water that has ingressed between the lamp fitting recess portion 26 of the door outer panel 22 and the rear lamp 24 may be prevented or inhibited from dripping down from the vehicle width direction end portion of the door outer panel 22.

Figure 7:
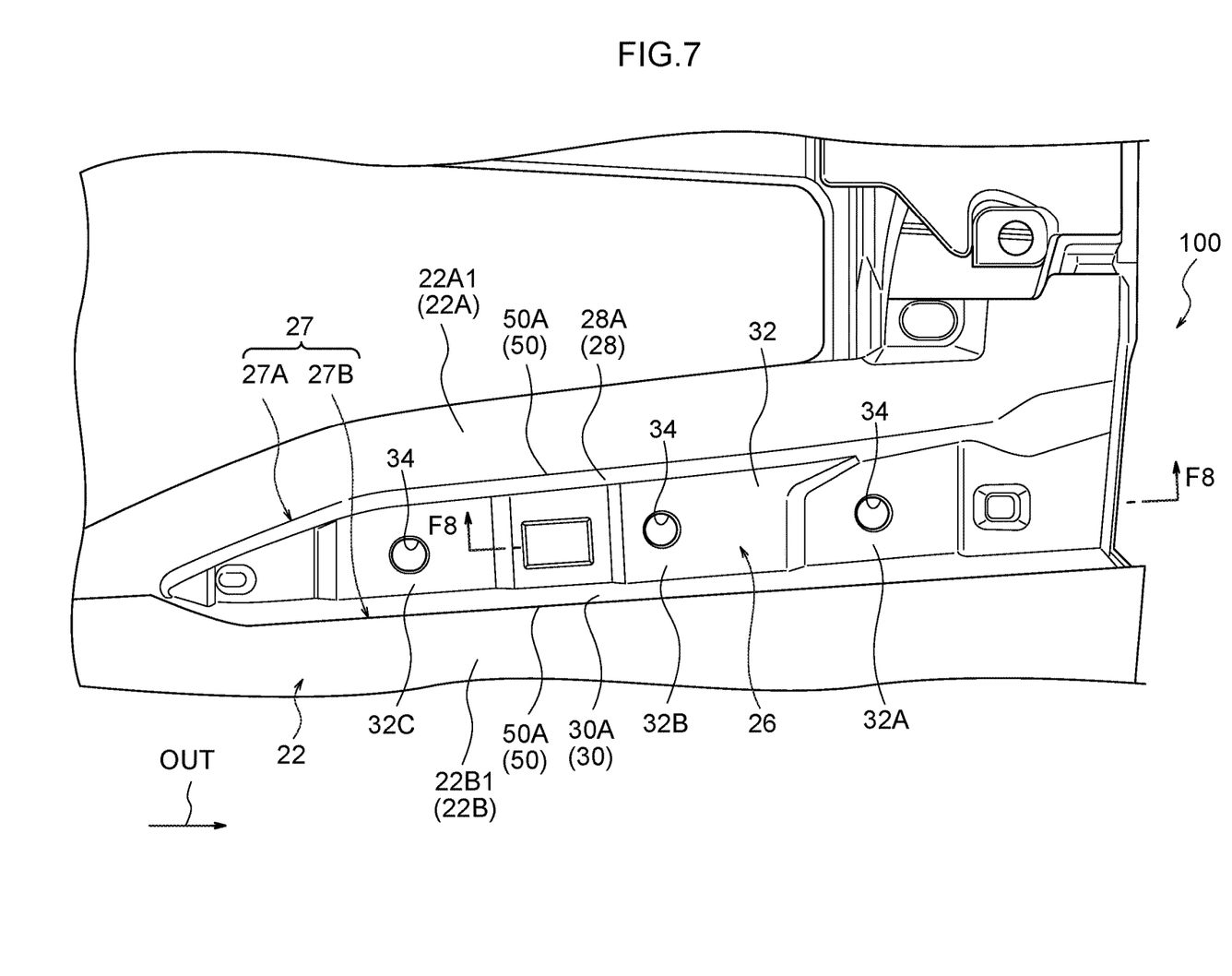
FIG. 7 is a view, corresponding to FIG. 3, illustrating partial structure of a vehicle back door according to a first comparative example.
Figure 8:
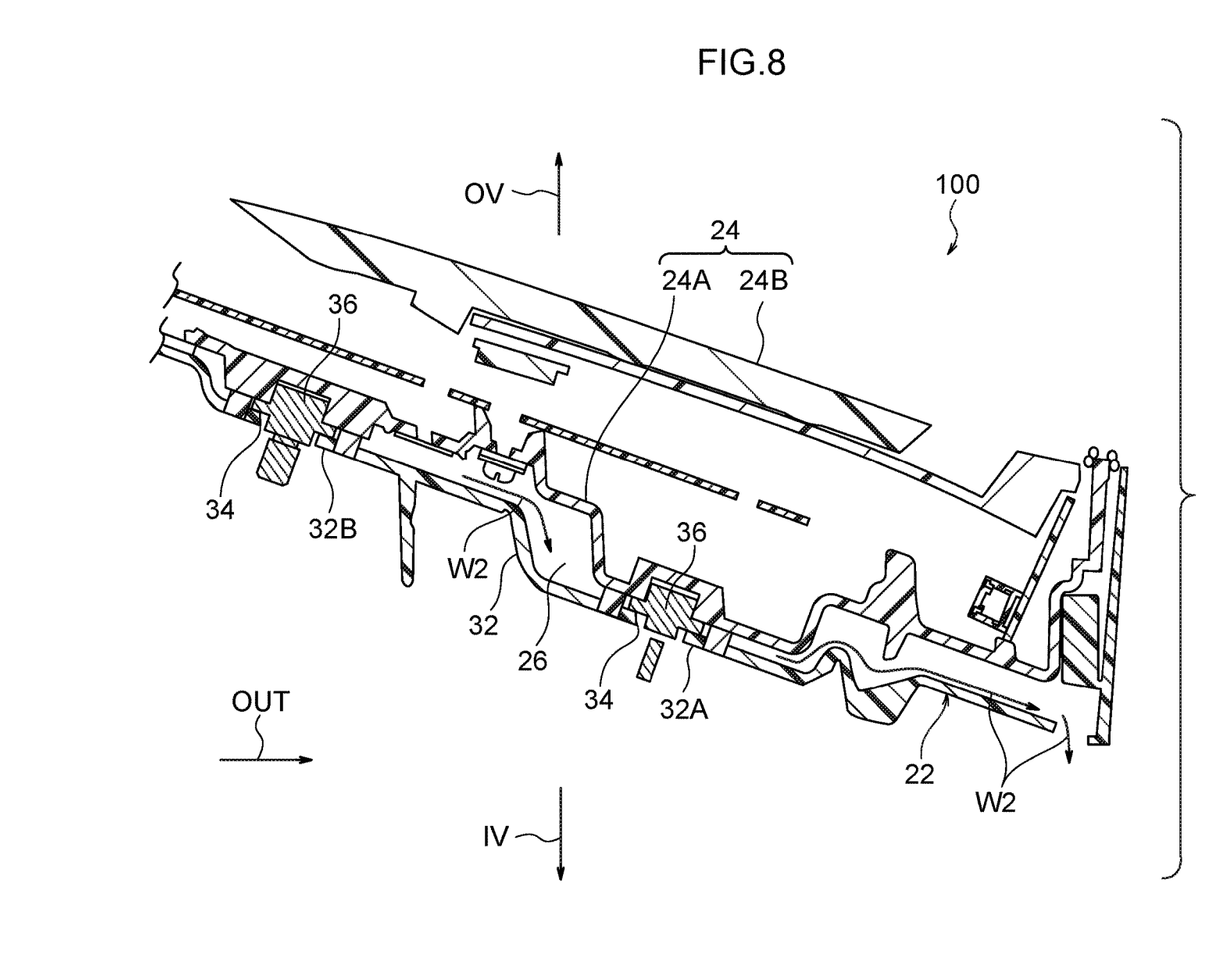
FIG. 8 is a sectional diagram illustrating a sectional view cut along line F8-F8 in FIG. 7.
Figure 9:
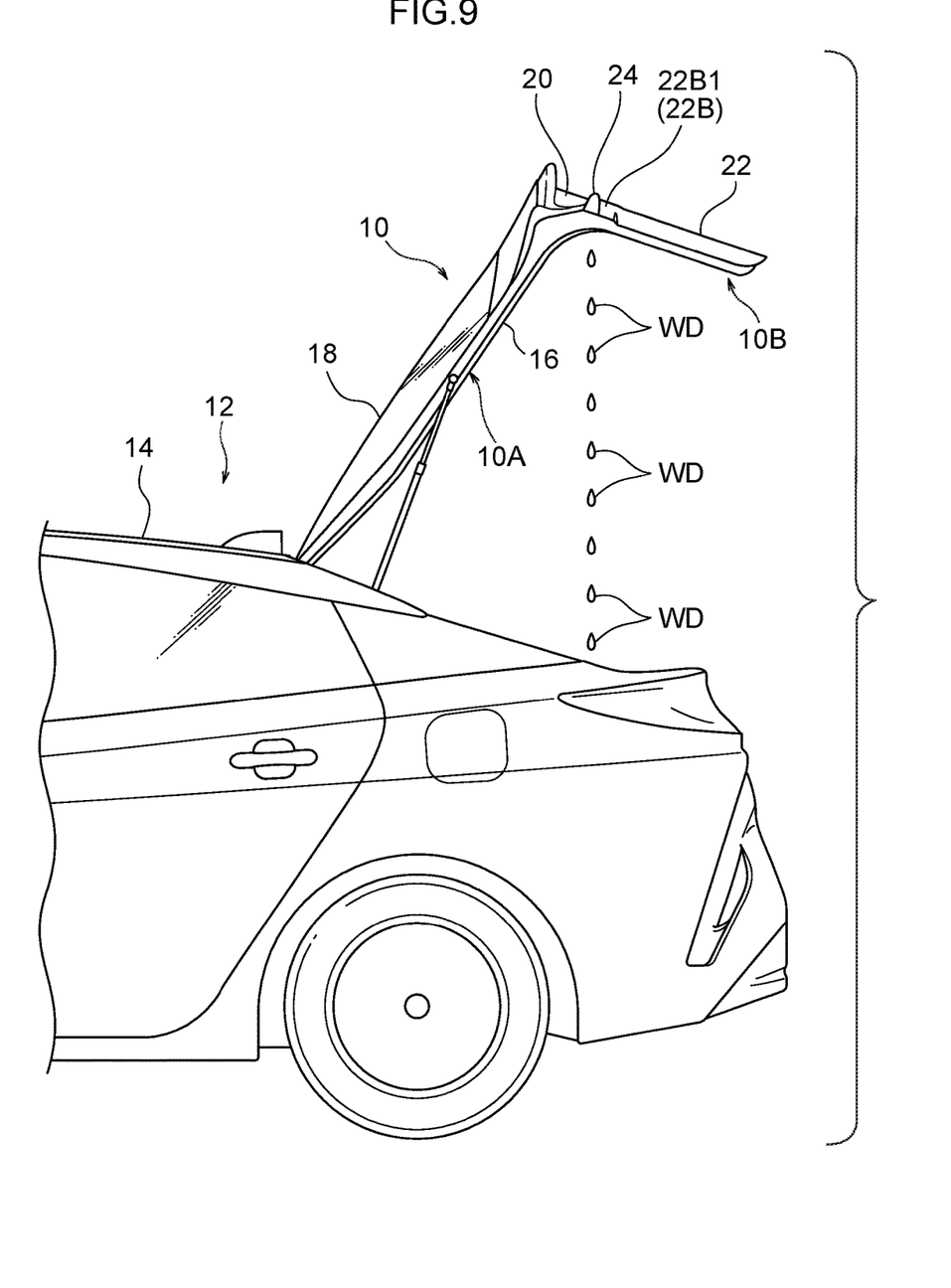
FIG. 9 is a view, corresponding to FIG. 2, illustrating a vehicle in which the vehicle back door according to the first comparative example is employed.

A supplementary description of the effect described above is given using a first comparative example, which is illustrated in FIG. 7 to FIG. 9. In FIG. 7 to FIG. 9, structures that are the same as in the present exemplary embodiment are assigned the same reference symbols. In a vehicle back door 100 according to the first comparative example, the water-retaining recess portion 38 is not formed in the floor wall 32 of the lamp fitting recess portion 26. Other structures are the same as in the present exemplary embodiment. In the first comparative example, water, that has ingressed between the lamp fitting recess portion 26 and the rear lamp 24, flows toward the vehicle width direction outer side when the door is opened (see the arrows W2 in FIG. 8). Hence, the flowing water may form the water droplets WD illustrated in FIG. 9 and drip down into a luggage compartment from the vehicle width direction end portion of the door outer panel 22. In contrast, this dripping of water may be prevented or inhibited in the present exemplary embodiment. In the present exemplary embodiment, when the door is closed, the water that has entered into the water-retaining recess portion 38 flows from inside the water-retaining recess portion 38 and drains out between the lamp fitting recess portion 26 and the rear lamp 24 in certain circumstances, such as during running of the vehicle and the like.

The present exemplary embodiment has a structure in which each rear lamp 24 is disposed at the vehicle outer side relative to the opening portion 39 of the water-retaining recess portion 38 and no portion of the rear lamp 24 enters the water-retaining recess portion 38. Therefore, a maximum water retention amount of the water-retaining recess portion 38 may be increased compared to a structure in which a portion of the rear lamp 24 enters the water-retaining recess portion 38.

In the present exemplary embodiment, each lamp fitting recess portion 26 includes the upper and lower inner wall faces that oppose one another in the up-and-down direction of the door outer panel 22 (i.e., the lower face 28A of the upper wall 28 and the upper face 30A of the lower wall 30). At the opening edge portion 27 of the lamp fitting recess portion 26, the face 22A1 at the vehicle outer side of the upper extension portion 22A of the door outer panel 22 and the lower face 28A of the upper wall 28 continues via the single inflected surface 50A that is inflected in a vehicle width direction view. Also at the opening edge portion 27, the face 22B1 at the vehicle outer side of the lower extension portion 22B of the door outer panel 22 and the upper face 30A of the lower wall 30 continues via the single inflected surface 52A that is inflected in the vehicle width direction view.

Due to the above structure, rainwater or the like that has adhered to the opening edge portion 27 of the lamp fitting recess portion 26 or a vicinity thereof is unlikely to flow toward the vehicle width direction outer side over the opening edge portion 27 of the lamp fitting recess portion 26, when the door is opened. In addition, it is easy for this rainwater or the like to flow into the lamp fitting recess portion 26 and to pool in the water-retaining recess portion 38. Therefore, in the present exemplary embodiment, occurrences of water that has passed over the opening edge portion 27 of the lamp fitting recess portion 26 and flowed toward the vehicle width direction outer side dripping down from the vehicle width direction end portion of the door outer panel 22 may be prevented or effectively inhibited.

Figure 10:
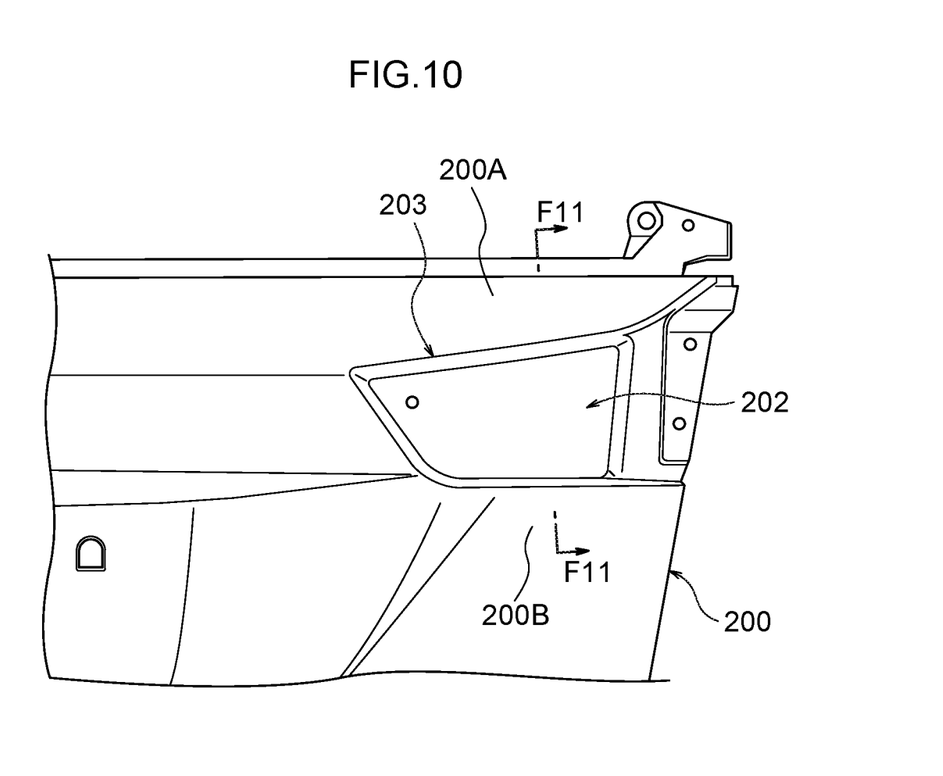
FIG. 10 is a rear view in which an outer panel of a vehicle back door according to a second comparative example is seen from the vehicle rear.
Figure 11:
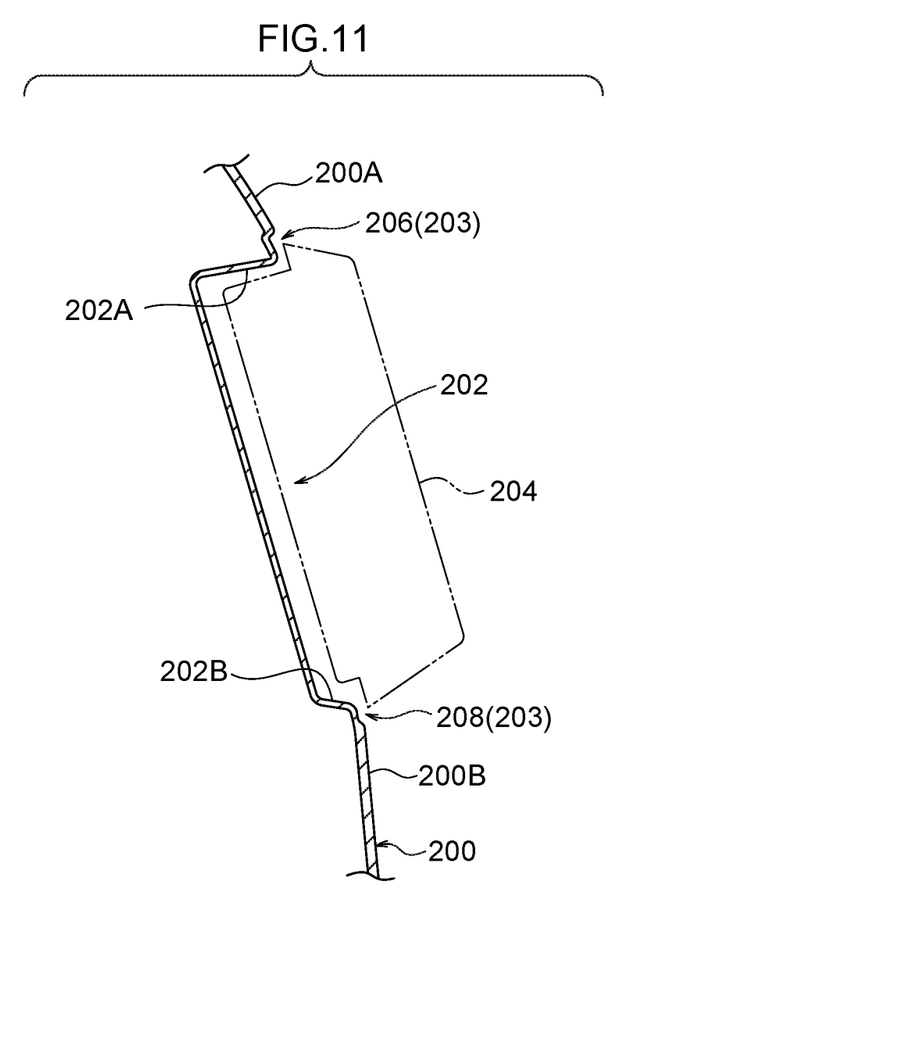
FIG. 11 is a magnified sectional view illustrating a magnification of a sectional view cut along line F11-F11 in FIG. 10.

A supplementary description of the effect described above is given using a second comparative example, which is illustrated in FIG. 10 and FIG. 11. In FIG. 11, a rear lamp 204 is illustrated by two-dot chain lines. At an opening edge portion 203 of a lamp fitting recess portion 202 of an outer panel 200 according to the second comparative example, faces 200A and 200B at the vehicle outer side of the outer panel 200, and upper and lower inner side faces 202A and 202B of the lamp fitting recess portion 202, continue via respective step-shaped faces 206 and 208. The step-shaped faces 206 and 208 each includes three curved surfaces (inflected surfaces) that are curved (inflected) in a vehicle width direction view.

With a structure as in the second comparative example, when the door is opened, rainwater or the like, that has adhered to the opening edge portion 203 of the lamp fitting recess portion 202 or a vicinity thereof, may easily flow toward the vehicle width direction outer side over the step-shaped faces 206 and 208. Hence, this water flowing toward the vehicle width direction outer side may drip down into a luggage compartment from a vehicle width direction end portion of the outer panel 200. In contrast, this may be prevented or inhibited in the present disclosure.

In the present exemplary embodiment, the upper and lower inner wall faces of the lamp fitting recess portion 26 (the lower face 28A of the upper wall 28 and the upper face 30A of the lower wall 30), and the upper and lower inner wall faces of the water-retaining recess portion 38 (the lower face 40A of the upper wall 40 and the upper face 42A of the lower wall 42) continue without any steps, respectively. Therefore, water, that ingresses between the rear lamp 24 and the lamp fitting recess portion 26 at the vehicle width direction middle side relative to the water-retaining recess portion 38 and flows toward the vehicle width direction outer side over the lower face 28A of the upper wall 28 or upper face 30A of the lower wall 30 of the lamp fitting recess portion 26, may smoothly flow into the water-retaining recess portion 38 over the lower face 40A of the upper wall 40 or upper face 42A of the lower wall 42 of the water-retaining recess portion 38.

In the present exemplary embodiment, the door outer panel 22 is fabricated of resin. Therefore, the water-retaining recess portion 38 may be easily formed with a deep depth, and the maximum water retention amount of the water-retaining recess portion 38 may be increased, compared to a structure in which the door outer panel 22 is fabricated of metal (a press-formed panel). Namely, in the present exemplary embodiment, the water-retaining recess portion 38 may be easily designed into the door outer panel 22 with a sufficient water retention amount and overflows of water from the water-retaining recess portion 38 may be avoided. In a back door fabricated of metal, since the shaping capabilities of press-forming are limited, it is difficult for a door panel that is an outer panel or the like to itself prevent or inhibit dripping of water from the door panel. Accordingly, moldings or the like would be provided at edge portions of the rear lamps, the back door glass and the like to inhibit the above-described dripping of water. In the present exemplary embodiment, these moldings or the like are not necessary, and costs may be reduced.

The present exemplary embodiment has a structure in which the rear lamp 24 is disposed at the vehicle outer side relative to the opening portion 39 of the water-retaining recess portion 38. However, the present disclosure is not limited thereto. A structure in which a portion of the rear lamp 24 enters the water-retaining recess portion 38 is also possible.

In the present exemplary embodiment, over the whole range in the vehicle width direction of the upper edge portion 27A and lower edge portion 27B of the opening edge portion 27 of the lamp fitting recess portion 26, the faces 22A1 and 22B1 at the vehicle outer side of the door outer panel 22 and the upper and lower inner wall faces of the lamp fitting recess portion 26 (the lower face 28A of the upper wall 28 and the upper face 30A of the lower wall 30) continue via the single inflected surfaces 50A and 52A, respectively. However, the present disclosure is not limited thereto. The above structure may be applied to only portions of the upper edge portion 27A and lower edge portion 27B. In this case, rainwater or the like may easily flow into the lamp fitting recess portion 26 at these portions and may be pooled in the water-retaining recess portion 38. According to this case, the rainwater or the like may be inhibited from flowing toward the vehicle width direction end portion of the door outer panel 22 over the upper edge portion 27A and the lower edge portion 27B.

The present exemplary embodiment has a structure in which the door outer panel 22 is fabricated of resin. However, the present disclosure is not limited thereto. A structure in which the door outer panel 22 is fabricated of metal may be possible. In this case, a structure in which, for example, the water-retaining recess portion is formed as a separate body from a main body portion of the outer panel and is attached to the main body portion of the outer panel, may be possible.

In the present exemplary embodiment, a case in which the present disclosure is applied to the vehicle back door 10 that is employed in the vehicle 12 of a liftback (hatchback) type, has been described. However, the present disclosure is not limited thereto. The present disclosure may be also applied to a vehicle trunk door (a trunk lid) that opens and closes an opening of a trunk compartment of a vehicle.

It will be clear that numerous modes may be embodied within a scope that does not depart from the gist of the present disclosure. It will also be clear that the scope of the present disclosure is not to be limited to the exemplary embodiment described above.

What is claimed is:

1. A vehicle door of a backlift type that opens and closes an opening formed in a vehicle body rear portion, the vehicle door comprising:
   an outer panel that is curved such that a vehicle width direction middle portion of the outer panel is disposed further toward a vehicle outer side than two vehicle width direction end portions of the outer panel;
   a lamp fitting recess portion, formed by the outer panel being recessed to a vehicle inner side at each of the two vehicle width direction ends of the outer panel, into which a rear lamp is to be fitted, and in which a plurality of connection portions at which the rear lamp is to be connected are formed in a floor wall of the lamp fitting recess portion; and
   a water-retaining recess portion formed in the floor wall at a vehicle width direction outer side relative to a connection portion, of the plurality of connection portions, that is disposed furthest to the vehicle width direction outer side, the water-retaining recess portion being recessed further toward the vehicle inner side than the connection portion that is disposed furthest toward the vehicle width direction outer side.

2. The vehicle door according to claim 1, wherein the rear lamp is disposed further toward the vehicle outer side than an opening portion of the water-retaining recess portion.

3. The vehicle door according to claim 1, wherein:
   the lamp fitting recess portion includes upper and lower inner wall faces that oppose one another in an up-and-down direction of the outer panel; and
   at opening edge portions of the lamp fitting recess portion, the upper and lower inner wall faces continue into respective faces at the vehicle outer side of the outer panel, via single curved surfaces that are curved in a vehicle width direction view.

4. The vehicle door according to claim 1, wherein:
   the lamp fitting recess portion includes upper and lower inner wall faces that oppose one another in an up-and-down direction of the outer panel;
   the water-retaining recess portion includes upper and lower inner wall faces that oppose one another in the up-and-down direction of the outer panel; and the upper and lower inner wall faces of the lamp fitting recess portion and the upper and lower inner wall faces of the water-retaining recess portion continue without steps, respectively.

* * * * *